United States Patent [19]

Medlin et al.

[11] Patent Number: 4,890,687
[45] Date of Patent: Jan. 2, 1990

[54] BOREHOLE ACOUSTIC TRANSMITTER

[75] Inventors: William L. Medlin, Dallas; Gary A. King, Sanger, both of Tex.

[73] Assignee: Mobil Oil Corporation, New York, N.Y.

[21] Appl. No.: 338,793

[22] Filed: Apr. 17, 1989

[51] Int. Cl.⁴ .............................................. G01V 1/40
[52] U.S. Cl. .................................... 181/106; 367/166; 367/171; 367/912
[58] Field of Search ................ 181/106; 367/155, 166, 367/171, 912; 310/322, 323, 337, 369

[56] References Cited

U.S. PATENT DOCUMENTS 4,674,067  6/1987  Zemanek, Jr. ................... 367/25
4,700,100  10/1987  Congdon et al. ................ 310/332

Primary Examiner—Thomas H. Tarcza
Assistant Examiner—Ian J. Lobo
Attorney, Agent, or Firm—Alexander J. McKillop; Charles J. Speciale; George W. Hager, Jr.

[57] ABSTRACT

An acoustic transmitter for use in a borehole logging tool employs multiple Helmholtz resonators stacked such that apertures in opposite sides of each of the resonators are in linear alignment so as to provide increased acoustic energy output over a broad band of low frequency seismic frequencies.

30 Claims, 3 Drawing Sheets

BOREHOLE ACOUSTIC TRANSMITTER

BACKGROUND OF THE INVENTION

This invention relates to an acoustic borehole transmitter for generating acoustic energy waves covering the entire acoustic band.

In acoustic borehole logging, an acoustic energy transmitter and one or more receivers disposed at spaced-apart distances from the transmitter are included in a borehole logging tool that is moved through a borehole. Acoustic energy waves generated by the transmitter travel through the subsurface formations surrounding the borehole and are detected by the receiver or receivers. One such logging tool is described in U.S. Pat. Nos. 4,383,308 and 4,432,077 to R. L. Caldwell.

A particularly suitable transmitter for generating low frequency acoustic energy waves in subsurface formations surrounding a borehole employs a Helmholtz resonator device. Helmholtz resonator principles are well known for use in the generation of sound as described in Fundamentals of Acoustics, by L. E. Kinsler, and A. R. Frey, Wiley and Sons, N.Y. (1962), pg. 186. All such resonators are characterized by a closed shell of spherical, cylindrical or other nature containing one or more small apertures. These apertures may be holes in the shell wall or tubes inserted through the shell wall. Neither the configuration of the shell nor the shape of the aperture are critical to the characteristics of the resonator. Such Helmholtz resonators have two fundamental resonances. One is the Helmholtz resonance associated with fluid flow through the aperture. The other is the shell resonance associated with the motion of the shell wall. Briefly, the Helmholtz resonant frequency f is given by:

$$f = ca/4\sqrt{\pi LV} \quad , \tag{1}$$

where
  V = volume of shell
  L = effective length of aperture (i.e., $L \sim l + 0.6a$),
  a = diameter of aperture, and
  c = velocity of sound.

Further, the shell resonant frequency is given by:

$$f = (1/\pi R)\sqrt{(GW/M)(1 + v)/(1 - v)} \quad , \tag{2}$$

where,
  R = mean radius of shell,
  W = shell thickness,
  G = shear modulus,
  M = mass of shell per unit area, and
  v = Poisson ratio of shell material.

Use of such a resonator as an acoustic transmitter in an acoustic borehole logging tool is described in U.S. Pat. No. 4,674,067 to J. Zemanek. However, such an acoustic transmitter is limited in that the diameter of the resonator shell must be no more than 3 to 4 inches for use in borehole logging. Consequently, the acoustic energy output level is limited and may not produce acoustic energy waves of sufficient amplitude to be adequately detected at receiver spaacings greater than 10 to 20 feet. Further, such an acoustic transmitter is limited in frequency response to a fundamental Helmholtz resonance in the range of 0.2 to 2 kilohertz and a fundamental shell resonance in the range of 10 to 20 kilohertz. With such frequency limitation, the transmitter cannot be used in frequency sweep applications over the entire 0 to 20 kilohertz frequency band such as described in U.S. Pat. No. 4,718,046 to Modlin.

It is therefore a specific object of the present invention to provide a Helmholtz resonator with large acoustic energy output and broadband frequency characteristics for use in borehole logging operations wherein long receiver spacings (i.e. greater than 20 ft.) are utilized and wherein sweep frequency applications are required for acoustic tube wave logging of wellbores.

SUMMARY OF THE INVENTION

In accordance with the present invention there is provided an acoustic transmitter for a borehole logging tool employing a plurality of closed shells of piezoelectric material vertically stacked and enclosed within a pliable boot. A pair of apertures are positioned in opposite sides of each of the shells. The shells are stacked such that all of the apertures are in alignment so as to provide acoustic coupling between the shells. Differing electrical polarities are applied to the inner and outer surfaces of the shells to excite the shells to vibrate at shell resonant frequencies controlled by the sizes of the shells and at Helmholtz resonant frequencies controlled by the sizes of the apertures in the shells.

In a more specific aspect, the size of the apertures in the shells control Helmholtz resonances within a range of 0.2 to 2 kilohertz. The apertures may be of identical size to provide for a single Helmholtz resonance or may be differing in sizes to provide a broadband range of Helmholtz resonances varying from 0.2 to 2 kilohertz. Apertures differing in about 0.05 inch increments produce multiple Helmholtz resonances spaced at about 200 hertz intervals.

Further, the shells may be spheres of different diameters no greater than about 4 inches in diameter to control shell resonances within a range of about 10 to 20 kilohertz. Still further, the shells may be cylinders of no greater than about 4 inches in diameter to control shell resonances within a range of about 2 to 10 kilohertz. In a yet further aspect, the shells may be a combination of spheres and cylinders to control shell resonance over the range of 2 to 20 kilohertz.

In another aspect of the invention, the size of the apertures in the shells can be varied by means of a slotted plug inserted into the apertures to reduce their size. Preferably the plugs are milled along their outer surfaces at a plurality of circumferential positions. Alternatively, the plugs may be perforated.

DESCRIPTION OF THE PREFERRED EMBODIMENT

Figure 1:
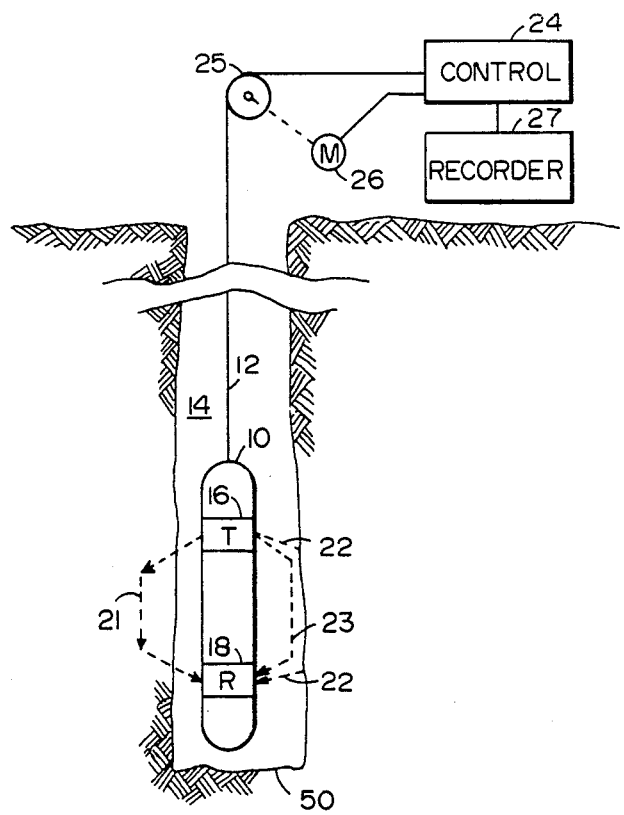
FIG. 1 illustrates a borehole acoustic logging system which may be utilized to generate acoustic energy waves in subsurface formations.

Referring now to FIG. 1, there will firstly be described a conventional borehole acoustic logging system with which the acoustic transmitter of the present invention may be utilized. The simplest acoustic logging system consists of a single transmitter and receiver. The logging tool 10 is suspended by cable 12 for movement along the length of the borehole 14. The logging tool includes an acoustic source or transmitter 16 for the production of repetitive time-spaced pulses of acoustic energy. One or more acoustic detectors or receivers 18 detects the generated acoustic pulses after their travel through the surrounding formations and converts them into representative electrical signals. The uphole components include a surface control unit 24 to which the cable 12 is directed over the sheave 25. A motor 26, which is controlled from the surface control unit 24, operates the sheave 25 for raising and lowering the logging tool 10 in the borehole 14. An output means, such as a digital recorder 27, is electrically connected to the surface control unit for recording and/or displaying the data detected from the logging tool 10. For more details and a more thorough understanding of the uphole recording of the acoustic waves detected by a borehole logging tool as shown in FIG. 1, reference may be made to U.S. Pat. Nos. 3,333,238 (Caldwell); 3,362,011 (Zemanek, Jr.); Re. 24,446 (Summers); and 4,383,308 (Caldwell).

Figure 2:
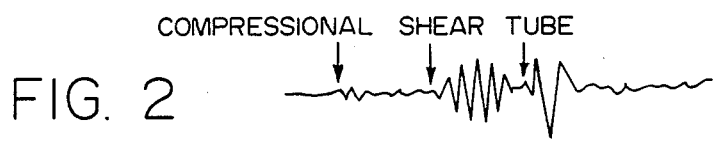
FIG. 2 illustrates a set of acoustic energy waveforms that are typically transmitted through subsurface formations surrounding a borehole as the logging tool of FIG. 1 is advanced through a borehole.

In carrying out the borehole logging operation, the logging tool 10 of FIG. 1 is initially lowered to the vicinity of the bottom 50 of the borehole 14. The acoustic source or transmitter 16 is energized. Some of the generated acoustic energy will be received directly by the receiver 18 as compressional and shear waves by way of path 21 adjacent the borehole; as tube waves by way of path 22 along the borehole wall; and as the normal mode by way of path 23 within the borehole. FIG. 2 is representative of a set of such acoustic waveforms as they might be received by the receiver 18 as the logging tool is advanced through the borehole. Compressional and tube waves are identified as P and T waves, respectively. Since the shear wave is indistinguishable from the onset of the normal mode due to concurrent arrival times at the receiver, both are identified together as S waves in FIG. 2.

After the recording of these acoustic waves, the arrival times of selected ones of said waves is determined. The arrival time of a particular wave type at the same receiver changes slowly as the logging tool is advanced through the borehole. Thus, the arrival time at the current depth point is very close to the arrival time at the next successive depth point. It is desirable to carry out the borehole logging operation by advancing the tool at a speed such that the arrival time at the next depth point is always less than a half-wave period away. This defines the time window on the next trace within which to look for the wave type arrival.

Figure 3:
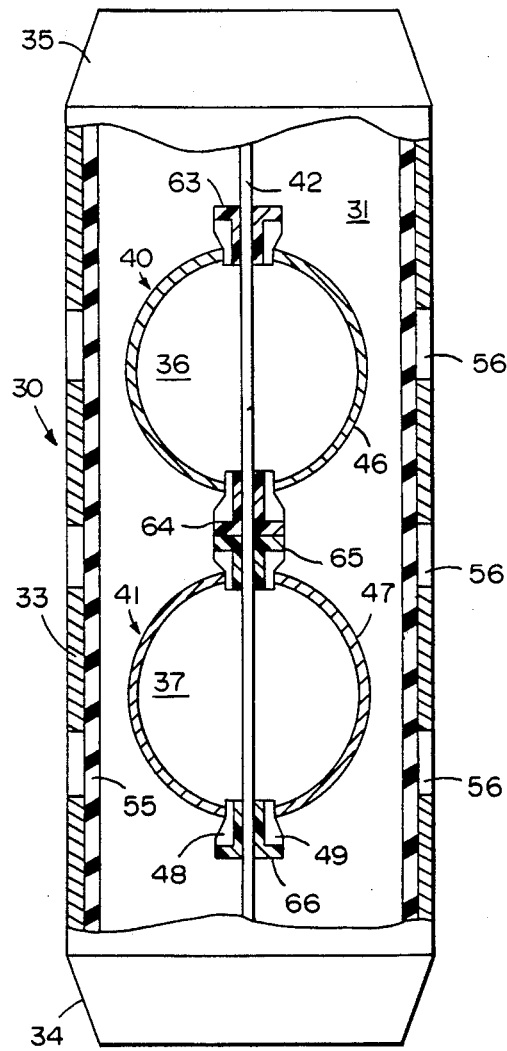
FIG. 3 is a cross-sectional view of an acoustic transmitter employing a pair of Helmholtz resonators in the borehole acoustic logging system of FIG. 1 in accordance with the present invention to generate low frequency acoustic energy waves.

Having now described a borehole logging system with which the acoustic transmitter of the present invention may be utilized, FIG. 3 may now be referred to along with the following description of such acoustic transmitter.

The transmitter 30 comprises a hollow cylindrical housing 33 closed at both ends by cap members 34 and 35. Mounted within the inner cavity 31 of housing 33 are a pair of spherical Helmholtz resonators 40 and 41. A rodlike member 42 extends through the inner cavity 31 between cap members 34 and 35. Resonators 40 and 41 are mounted on rod 42 by means of plugs 63–66 inserted into apertures located on opposite sides of the shell walls 46 and 47 of the resonators 40 and 41 respectively. Plugs 63–66 are milled along their outer surfaces to form a plurality of slots, such as slots 48 and 49 of plug 46 for example, which provide fluid communication between the inner cavity 31 of housing 33 and the inner cavities 36 and 37 of the resonators 40 and 41 respectively. Preferably the shells 46 and 47 are constructed of piezoelectric material which are excited into resonant modes of vibration, as expressed by equation (2) above, by the application of voltages of opposite polarity (not shown) applied across the inner and outer surfaces of such shells 46 and 47. As these shells resonate, the motion of the shell walls causes fluid movement within the cavities 36 and 37 which in turn excite the Helmholtz resonant mode of vibration which is associated with fluid flow through the apertures and as expressed in equation (1) above. These two modes of vibration, Helmholtz resonance and shell resonance, are coupled through the fluid contained in the cavity 31 to the inner surface of pliable boot 55, such as rubber, which runs along the inner surface of housing 33. Slots 56 in the housing 33 allow the borehole fluid to contact the outer surface of boot 55. In this manner, the acoustic energy vibrations imparted to the fluid within cavity 31 by the transmitter 30 are also imparted by way of pliable boot 55 to the borehole fluid, and hence the the formations surrounding the borehole.

Figure 4:
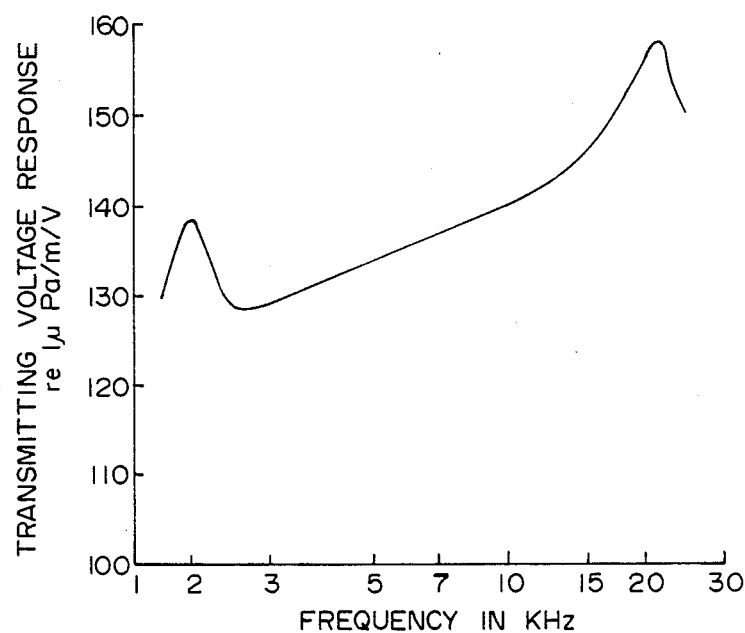
FIG. 4 is a plot of frequency versus acoustic energy level for the acoustic transmitter of FIG. 3.

By stacking two or more Helmholtz resonators as shown in FIG. 3, higher acoustic energy output levels are achieved. In a preferred embodiment the pair of spherical resonators are about 3 inches in diameter with shell wall thickness of about $\frac{1}{8}$ inch. For $\frac{1}{2}$ inch apertures in each of the resonators, the total acoustic energy output level is raised by about 10 Db from that of a single resonator over the entire frequency span. Such improved output is shown in FIG. 4. The frequency response shown in FIG. 4 is useful for frequency sweep applications. Between about 3 and 12 kilohertz the source level increases montonically with frequency. A frequency sweep over this range can be normalized readily for variations in source level. In this regard, the transmitter of FIG. 3 has desirable broad band characteristics.

Such a stacking technique of Helmholtz resonators can be used to couple multiple resonators to produce ever larger acoustic energy output levels, which is particularly desirable for use in borehole logging tools with source-to-receiver spacings of 20 feet or more.

Figure 5:
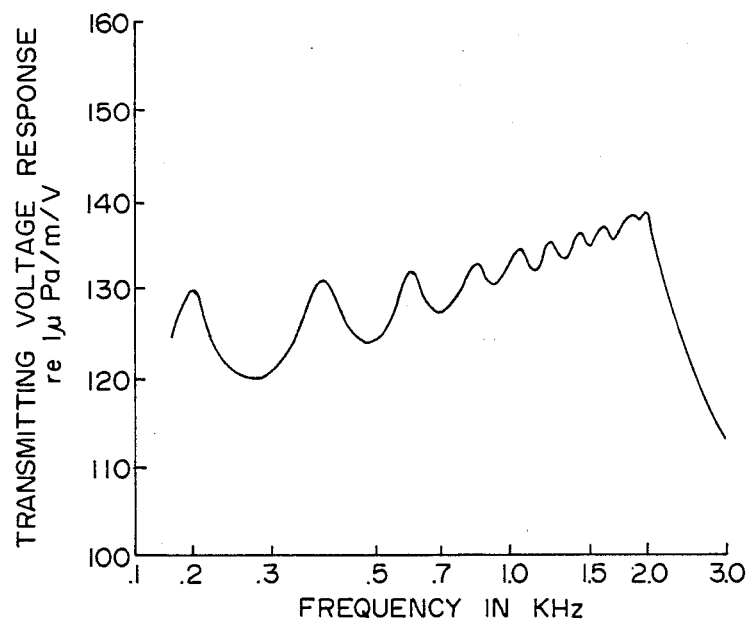
FIG. 5 is a plot of frequency versus acoustic energy level over the low frequency band for the acoustic transmitter of FIG. 3 modified to employ ten Helmholtz resonators with apertures ranging from 0.05 inches in .05 inch increments.

In an even further aspect of the invention, the stacking of Helmholtz resonators can be used to couple resonators with differing apertures to obtain broad band characteristics in the low frequency seismic range. For example, ten spheres can be stacked with apertures ranging from 0.05 to 0.5 inch in 0.05 inch increments. According to equation (1), this will produce 10 Helmholtz resonances spaced at 0.2 kilohertz intervals between 0.2 and 2 kilohertz. This will produce the response curve as shown in FIG. 5. An acoustic transmitter with this response has desirable broad band characteristics in the low frequency seismic band. It would be appropriate for frequency sweep applications over the 0.2 to 2.0 kilohertz band where tube waves are the predominant mode of wellbore vibrations.

Such stacking technique can be applied to non-spherical resonators such as cylindrical resonators with apertures in the top and bottoms of the cylinders. While stacked spheres with apertures aligned can be made with appropriate volumes to cover a shell resonance range of 10 to 20 kilohertz, stacked cylinders with apertures aligned can be made with appropriate volumes to cover a shell resonance range of 2 to 10 kilohertz. Further, by stacking both spheres and cylinders in combination, a shell resonance range of 2 to 20 kilohertz can be achieved along with the 0.2 to 2 kilohertz Helmholtz resonance range, thus providing a broad band frequency response over the entire acoustic frequency band of 0.2 to 20 kilohertz.

Having now described specific embodiments of the present invention, it will be understood that further modifications thereof may be made by those skilled in the art without departing from the spirit and scope of the invention as set forth in the appended claims.

I claim:

1. An acoustic transmitter for a borehole logging tool, comprising:
   (a) a liquid-filled, pliable boot,
   (b) a plurality of liquid-filled, closed shells of piezoelectric material linearly stacked within said pliable boot,
   (c) a pair of apertures positioned in opposite sides of each of said shells, said shells being linearly stacked such that all of said apertures are in alignment thereby providing acoustic coupling between said shells,
   (d) electrical contacts to the inner and outer surfaces of said shells to which differing electrical polarities are applied, and
   (e) means for modulating the application of said differing electrical polarities to said shells to excite said shells to vibrate at resonant frequencies controlled by the sizes of said shells and said apertures to produce an acoustic energy wave in subsurface formations surrounding a borehole in which the borehole logging tool is placed.

2. The acoustic transmitter of claim 1 wherein the size of said apertures in said shells controls Helmholtz resonance within a range of about 0.2 to 2 kilohertz.

3. The acoustic transmitter of claim 2 wherein said apertures are of identical sizes.

4. The acoustic transmitter of claim 2 wherein said apertures are of differing sizes ranging from about 0.05 to 0.5 inch to produce a broad band acoustic energy wave with multiple Helmholtz resonances from about 0.2 to 2 kilohertz.

5. The acoustic transmitter of claim 4 wherein said apertures differ in about 0.05 inch increments to produce multiple Helmholtz resonances spaced at about 200 hertz intervals from about 0.2 to 2 kilohertz.

6. The acoustic transmitter of claim 1 wherein said shells are spheres.

7. The acoustic transmitter of claim 5 wherein the sizes of said spheres are selected to control shell resonance within a range of about 10 to 20 kilohertz.

8. The acoustic transmitter of claim 7 wherein the diameters of said spheres are no greater than about 4 inches.

9. The acoustic transmitter of claim 8 wherein said spheres are about 3 inches in diameter.

10. The acoustic transmitter of claim 9 wherein the thicknesses of said spheres are about ⅛ inch.

11. The acoustic transmitter of claim 1 wherein said shells are cylinders.

12. The acoustic transmitter of claim 11 wherein said apertures are located in the ends of said cylinders.

13. The acoustic transmitter of claim 12 wherein the sizes of said cylinders are selected to control shell resonance within a range of about 2 to 10 kilohertz.

14. The acoustic transmitter of claim 13 wherein the diameters of said cylinders are no greater than about 4 inches.

15. The acoustic transmitter of claim 14 wherein said cylinders are about 3 inches in diameter.

16. The acoustic transmitter of claim 15 wherein the thickness of said cylinders is about ⅛ inch.

17. The acoustic transmitter of claim 1 wherein a portion of said plurality of shells are spheres and a portion of said plurality of shells are cylinders.

18. The acoustic transmitter of claim 17 wherein:
   (a) the sizes of the apertures in said shells are selected to produce multiple Helmholtz resonances in the range of 0.2 to 2 kilohertz,
   (b) the sizes of said spheres are selected to produce shell resonances in the range of 10 to 20 kilohertz, and
   (c) the sizes of said cylinders are selected to produce shell resonances in the range of 2 to 10 kilohertz, such that a broad band acoustic energy wave in the range of 0.2 to 20 kilohertz is produced.

19. The acoustic transmitter of claim 2 further comprising means of inserting plugs into each of said apertures for reducing the size of said apertures.

20. The acoustic transmitter of claim 19 wherein said means for reducing the size of said apertures are plugs with slots milled along the outer surfaces.

21. The acoustic transmitter of claim 20 wherein said slotted plugs reduce the size of said apertures by differing amounts such that the effective sizes of said apertures range from about 0.05 to 0.5 inch to produce a broad band acoustic energy wave with multiple Helmholtz resonances from about 0.2 to 2 kilohertz.

22. The acoustic transmitter of claim 20 wherein said slotted plugs are milled along their outer surfaces at a plurality of circumferential positions.

23. The acoustic transmitter of claim 19 wherein said means for reducing the size of said apertures are perforated plugs.

24. The acoustic transmitter of claim 23 wherein said perforated plugs reduce the size of said apertures by differing amounts such that the effective sizes of said apertures range from about 0.05 to 0.5 inch to produce a broad band acoustic energy wave with multiple Helmholtz resonances from about 0.2 to 2 kilohertz.

25. The acoustic transmitter of claim 2 wherein tubes are inserted into said apertures, the volumes within said tubes controlling Helmholtz resonance within a range of about 0.2 to 2 kilohertz.

26. The acoustic transmitter of claim 26 wherein the volumes of said tubes differing to produce a broad band acoustic energy wave with multiple Helmholtz resonances from about 0.2 to 2 kilohertz.

27. An acoustic transmitter for a borehole logging tool comprising:
   (a) a liquid-filled, pliable boot, (b) a first closed shell of piezoelectric material filled with a liquid and positioned within said boot, (c) a first pair of apertures in said first shell positioned on opposite sides of said first shell, and (d) a second closed shell of piezoelectric material filled with a liquid and positioned within said boot, said second shell being identical in size to said first shell, (e) a second pair of apertures in said second shell positioned on opposite sides of said second shell and differing in size from said first pair of apertures, said first and second shells being positioned in contact with one another within said boot such that said first and second pair of apertures are in alignment so as to provide liquid communication between said shells, (f) electrical contacts to the inner and outer surfaces of said shells to which differing electrical polarities are applied, and (g) means for modulating the application of said differing electrical polarities to said shells to excite said shells to vibrate at differing resonant frequencies controlled by the differing sizes of said first and second pairs of apertures thereby generating a broad band acoustic energy wave in subsurface formations surrounding a borehole in which the borehole logging tool is placed.

28. The acoustic transmitter of claim 27 wherein said first and second shells are spheres.

29. The acoustic transmitter of claim 27 wherein said shells are about 3 inches in diameter and said apertures are about ½ inch in diameter, thereby producing shell resonance of about 20 kilohertz and Helmholtz resonance of about 2 kilohertz.

30. The acoustic transmitter of claim 29 further including means for partially plugging said apertures to reduce the size of said apertures by a factor of about 2.5, such that Helmholtz resonance is correspondingly reduced to about 0.8 kilohertz.

* * * * *

UNITED STATES PATENT AND TRADEMARK OFFICE
CERTIFICATE OF CORRECTION

PATENT NO. : 4,890,687

DATED : January 2, 1990

INVENTOR(S) : William L. Medlin and Gary A. Ring

It is certified that error appears in the above-identified patent and that said Letters Patent is hereby corrected as shown below:

First page, line [75], 2nd inventor's name should be " Gary A. Ring"

Col. 1, line 43, "L~1" should be -- $L^{-1}$ --

Col. 1, line 56, "v=" should be -- $\nu=$ --

Col. 1, line 65, "spaacings" should be -- spacings --

Col. 2, line 5, "Modlin" should be -- Medlin -

Col. 6, line 62, "claim 26" should be -- claim 25 --

Col. 6, line 63, "differing" should be -- differ --

Signed and Sealed this

Fourth Day of June, 1991

Attest:

HARRY F. MANBECK, JR.

Attesting Officer

Commissioner of Patents and Trademarks